United States Patent
Grove et al.

(10) Patent No.: US 10,875,714 B2
(45) Date of Patent: Dec. 29, 2020

(54) TRUSS STORAGE AND TRANSPORT APPARATUS

(71) Applicant: Christie Lites Enterprises Canada Inc., Toronto (CA)

(72) Inventors: Michael Grove, Orlando, FL (US); Huntly Gordon Christie, Orlando, FL (US); Dan Souwand, Toronto (CA)

(73) Assignee: Christie Lites Enterprises Canada Inc., Toronto (CA)

( * ) Notice: Subject to any disclaimer, the term of this patent is extended or adjusted under 35 U.S.C. 154(b) by 38 days.

(21) Appl. No.: 16/370,116

(22) Filed: Mar. 29, 2019

(65) Prior Publication Data

US 2019/0315568 A1    Oct. 17, 2019

(51) Int. Cl.
*B65D 85/20* (2006.01)
*B65G 1/14* (2006.01)

(52) U.S. Cl.
CPC ............ *B65G 1/14* (2013.01); *B65G 2201/02* (2013.01)

(58) Field of Classification Search
CPC .............. B65D 85/20; B65D 19/44; B65D 2571/00043; B62J 11/00; F16L 3/2235; F16L 3/237; F16L 55/172; E04C 3/08; E04H 12/10
USPC ............................................... 248/74.4, 74.5
See application file for complete search history.

(56) References Cited

U.S. PATENT DOCUMENTS

| | | | | |
|---|---|---|---|---|
| D49,682 | S | * | 9/1916 | Abbott |
| 3,590,752 | A | * | 7/1971 | De Pew .................. B65D 19/44 108/55.3 |
| 5,092,631 | A | * | 3/1992 | Masnik .................... F16L 55/00 285/14 |
| 5,141,076 | A | * | 8/1992 | Joyce ......................... E06C 7/46 182/108 |
| 5,299,720 | A | * | 4/1994 | Koch, III .................... B62J 9/22 224/406 |
| 5,433,322 | A | | 7/1995 | Williams |
| D384,481 | S | * | 9/1997 | Sheckells ....................... D34/38 |

(Continued)

FOREIGN PATENT DOCUMENTS

| | | |
|---|---|---|
| CN | 203158477 | 8/2013 |
| CN | 204489561 | 7/2015 |
| DE | 202013001257 | 4/2013 |

OTHER PUBLICATIONS

Adam Hall 38210P Truss Stacker, plastic, for 38102/38103 Roller Carriage, for 3 Point Truss Not Suitable, URL: https://www.huss-licht-ton.de/product_info.php/en/Adam-Hall-38210P-Truss-Stacker/info/8567.html, Total 4 pages, downloaded Apr. 12, 2018.

(Continued)

*Primary Examiner* — Brian E Glessner
*Assistant Examiner* — Daniel J Kenny
(74) *Attorney, Agent, or Firm* — DLA Piper LLP (US)

(57) ABSTRACT

Truss sections are commonly used at concerts and shows to support displays, camera, sound and lighting equipment. During transport or storage, the truss sections are stacked on top of each other. The apparatus is mountable to a cross member of a truss section. The apparatus comprises depressions on the surface. Longitudinal members (which are perpendicular to said cross member when stacked) of a second truss section can be positioned within the depressions to limit the relative movement between truss sections which are stacked.

7 Claims, 8 Drawing Sheets

(56) References Cited

U.S. PATENT DOCUMENTS

| | | | | |
|---|---|---|---|---|
| 6,079,178 | A  * | 6/2000 | Fisher | E04C 3/08 |
| | | | | 52/634 |
| 6,997,330 | B2 * | 2/2006 | Pachao-Morbitzer | ......... |
| | | | | B65D 71/0092 |
| | | | | 206/391 |
| 7,789,352 | B2 * | 9/2010 | Darling, III | A61G 1/0293 |
| | | | | 24/514 |
| 7,815,156 | B2 * | 10/2010 | Yang | B62J 11/00 |
| | | | | 248/218.4 |
| 8,517,397 | B2 * | 8/2013 | Gross | E04C 3/005 |
| | | | | 280/35 |
| 8,915,169 | B2 * | 12/2014 | Chang | B25G 1/066 |
| | | | | 81/177.8 |
| 9,046,198 | B2 * | 6/2015 | Mongiorgi | F16L 3/2235 |
| D788,576 | S   * | 6/2017 | Scibetta | D8/396 |
| 2013/0075993 | A1* | 3/2013 | Christie | B62B 3/02 |
| | | | | 280/79.3 |

OTHER PUBLICATIONS

Adam Hall 38220 Truss T-Claw, Truss Stacker for Traverses with 290mm Dimmension, Material 6PA, black, URL: https://huss-licht-ton.de/product_info.php/en/Adam-Hall-38220-Truss-T-Claw/info/12043.html, Total 3 pages, downloaded Apr. 12, 2018.

XSF Xtreme Structures and Fabrication, Stacking/Rig Points, URL: https://www.xsftruss.com/stacking-rig-points/, Total 3 pages, downloaded Apr. 12, 2018.

Prolyte Truss carrier and Truss dolly https://www.youtube.com/watch?v=FUVL9125xFY, Sep. 22, 2015.

Search Report issued in GB 1905190.3 dated Oct. 15, 2019.

* cited by examiner

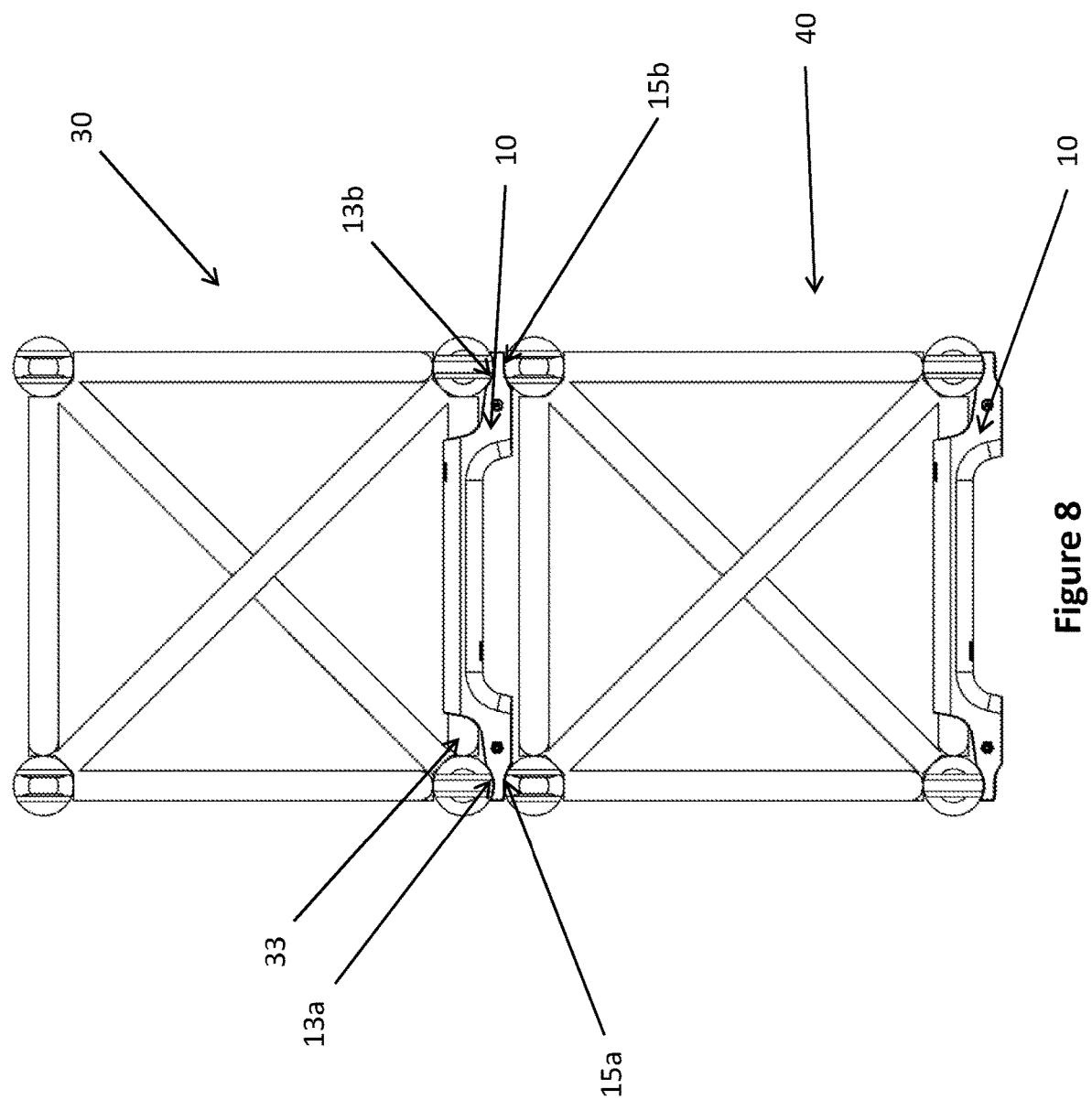

TRUSS STORAGE AND TRANSPORT APPARATUS

CROSS REFERENCE TO RELATED APPLICATIONS

This application claims priority from Canadian Application No. 3,001,391 filed Apr. 13, 2018. The above application is incorporated herein by reference.

FIELD

Truss sections are combined to form a truss structure, which may be used to support displays, lighting systems, or sound systems for concerts, festivals, trade shows or in theatres. Truss sections are transported to and from venues to storage facilities when not in use. The present disclosure generally relates to an apparatus that facilitates the storage and transport of truss sections.

BACKGROUND

Truss sections are used in a variety of industries, including in the entertainment industry, where they are used for the construction of truss assemblies for mounting equipment such as lighting, cameras, displays, and speaker systems. Truss assemblies are commonly used in venues (and in particular entertainment venues) for this purpose.

A truss section typically constructed with parallel longitudinal outer frame members, connected together by cross members (cross bars or struts). Often there are four longitudinal members in each truss section (for example, in box-type truss sections), connected by right-angle and diagonal cross members. A square or rectangular outer perimeter profile may be used although other arrangements are known and used, also. The members of the truss section are typically constructed of a rigid material such as, for example, steel or other suitable alloy, aluminum or other suitable metal. Generally, the finish on the members results in truss sections with a relatively low coefficient of friction as between the surfaces of the members.

Not all entertainment venues are equipped with means to secure lighting, sound, camera, and display equipment. In some cases truss sections are transported to the venue and assembled onsite to form a larger truss structure. Because renting a venue can be costly, it is desirable for truss structures to be transported, assembled and disassembled quickly to minimize venue rental costs. Assembling or disassembling truss structures can be a large and complex job, so too is storage and transport of truss sections which are used in assemble of such structures.

Once no longer needed at a venue, a truss structure must be disassembled into its component truss sections, and these sections are commonly stored offsite. For efficient storage, truss sections may be stacked atop one another. Stacks of truss sections may be loaded onto a wheeled dolly for to allow the truss sections to be moved (for example from a stage to a truck).

A vertical stack of truss sections may be formed by stacking truss sections in layers of two or more truss sections. When finished, a stack may reach multiple metres in height.

Due to the height of stacked truss sections, the inherently low friction coefficient of truss members, and the fact that with the usual truss structure there is no seating between individual stacked truss sections, the sections have been known to slip out from within a stack when being moved. Sections that slip out of a stack can be damaged; they may also cause damage to the venue, the transport equipment, and/or injury to the individuals involved in transporting equipment. If a truss section is damaged, it may not be apparent to the naked eye whether it is damaged in such a way that the structural integrity of the section is compromised. Because truss sections are commonly used to assemble large weight-bearing structures, their structural integrity is important for safety.

Stacking boards with surface grooves may be used to create a seating between each layer of truss sections in order to reduce the risk that the sections will slip out from the stack when a stack of truss sections is being moved. Laying down stacking boards above each layer of truss sections is an additional step that prolongs the process of preparing truss sections for transport. Further, stacking boards also have to be stored, often in a separate location, when the trusses are in use.

BRIEF DESCRIPTION OF THE DRAWINGS

The following drawings illustrate examples of the components disclosed herein, and are for illustrative purposes only. Other embodiments that are substantially similar can use other components that have a different appearance.

FIG. 8 is a front view of the assembly of FIG. 6.

DETAILED DESCRIPTION

Figure 1:
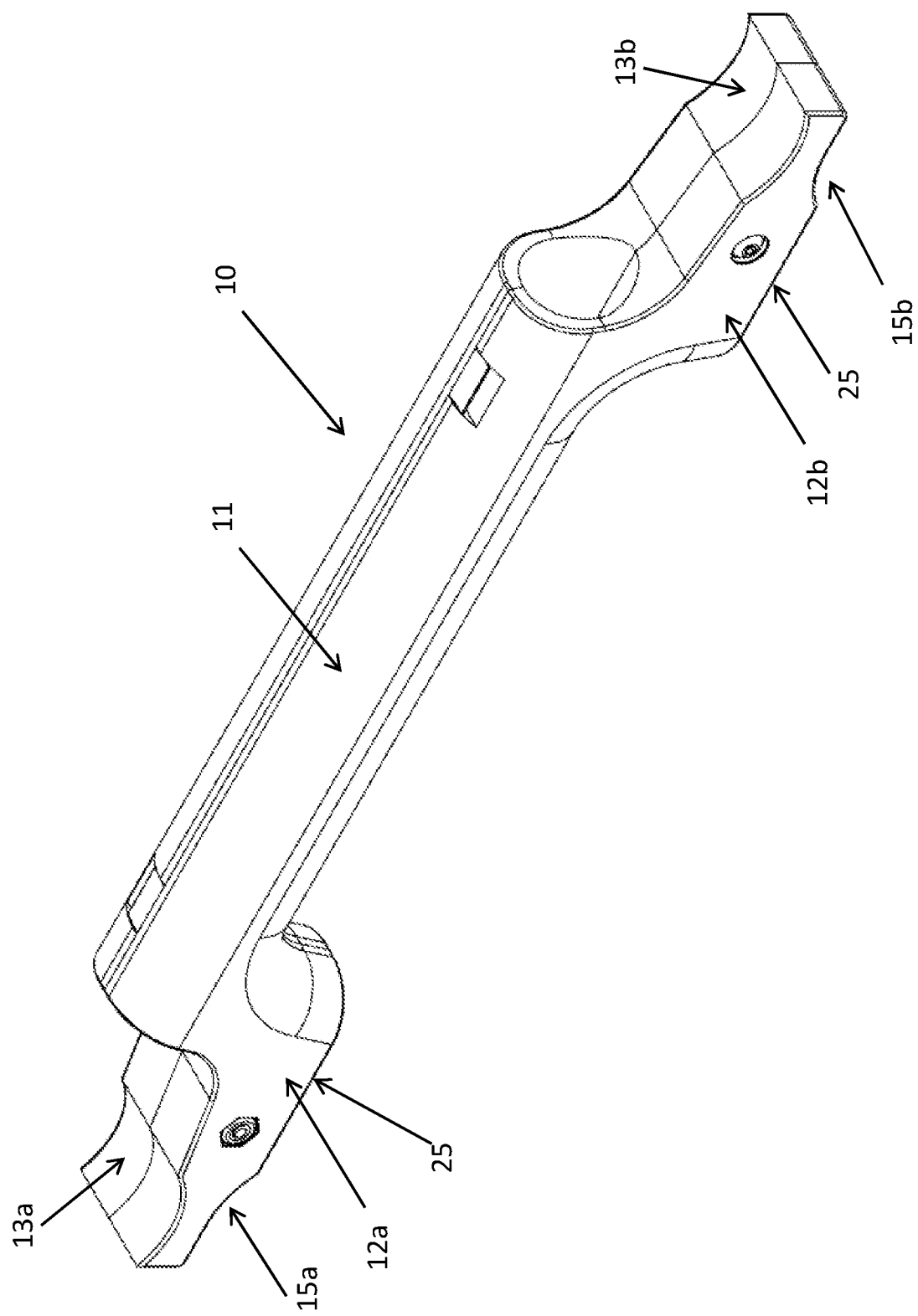
FIG. 1 is an isometric view of an embodiment of the apparatus.

There is therefore provided an apparatus for use in the stacking of truss sections.

In one aspect, an apparatus for stacking a first truss section and a second truss section is provided. The truss sections are stackable and each comprise longitudinal members that are connected by cross members. The apparatus comprises: a first end and a second end; a rectilinear mounting portion comprising a sleeve intermediate the first and second ends for fixably mounting the apparatus to a cross member of the first truss section; the first end comprising a surface for contact with a portion of a first longitudinal member of the first truss section and an opposing surface for contact with a portion of a first longitudinal member of the second truss section when in stacked relationship to the first, and the second end comprising a surface for contact with a portion of a second longitudinal member of the first truss section and an opposing surface for contact with a portion of a second longitudinal member of the second truss section when in stacked relationship to the first.

In another aspect, the opposing surfaces of the first and second end are friction surfaces.

In yet another aspect, the friction surfaces comprise feet.

In a further aspect, the feet are made of rubber.

In yet a further aspect, the apparatus is made of a material selected from the group of wood, polyvinylchloride (PVC), and high density polyethylene (HDPE).

In another aspect, the first and second ends further comprise a flat base portion adjacent said opposing surfaces for contact with the first and second longitudinal members of the second truss section.

In yet another aspect, the first and second ends further comprises a lip extending from the opposing surfaces for further restricting the relative movement between the first truss section and the second truss section.

In a further aspect, the opposing surfaces for contacting the first and second longitudinal members of the second truss section are concave, wherein the curvature of said opposing surfaces are dimensioned to closely fit around the longitudinal members of the second truss section.

In yet a further aspect, the surfaces for contacting the first and second longitudinal members of the first truss section are concave, wherein the curvature of said opposing surfaces are dimensioned to closely fit around the longitudinal members of the first truss section.

In another aspect, the apparatus comprises: a first shell portion and a second shell portion. The first shell portion comprises: a first end and a second end and a mounting portion intermediate the first and second ends for fixably mounting the apparatus to a cross member of a first truss section. The first and second ends each comprise a surface for receiving a pair of spaced apart elongate members of the second truss section. The second shell portion is adapted to mate with the first shell portion. The second shell portion comprises: a first end and a second end; a mounting portion intermediate the first and second ends for fixably mounting the apparatus to a cross member of a first truss section. The first and second end of the second shell portion each comprise a surface for receiving a pair of spaced apart elongate members of the second truss section. The first shell portion and second shell portion are mounted to the cross member by mating the mounting portion of the first shell portion and the mounting portion of the second shell portion around the cross member and fastening the two portions together. When the elongate members of the second truss section are received by the surface of the first and second ends of the first and second shell portions, the first truss section and second truss section are restricted from movement relative to each other.

In a further aspect, the apparatus comprises: a body comprising a first end and a second end and a mounting portion intermediate the first and second ends for fixably mounting the apparatus to a cross member of a first truss section. The first and second end each comprise a surface for receiving a pair of spaced apart elongate members of a second truss section. When the elongate members of the second truss section are received by the surface of the first and second ends, the first truss section and second truss section are restricted from movement relative to each other.

Figure 2:
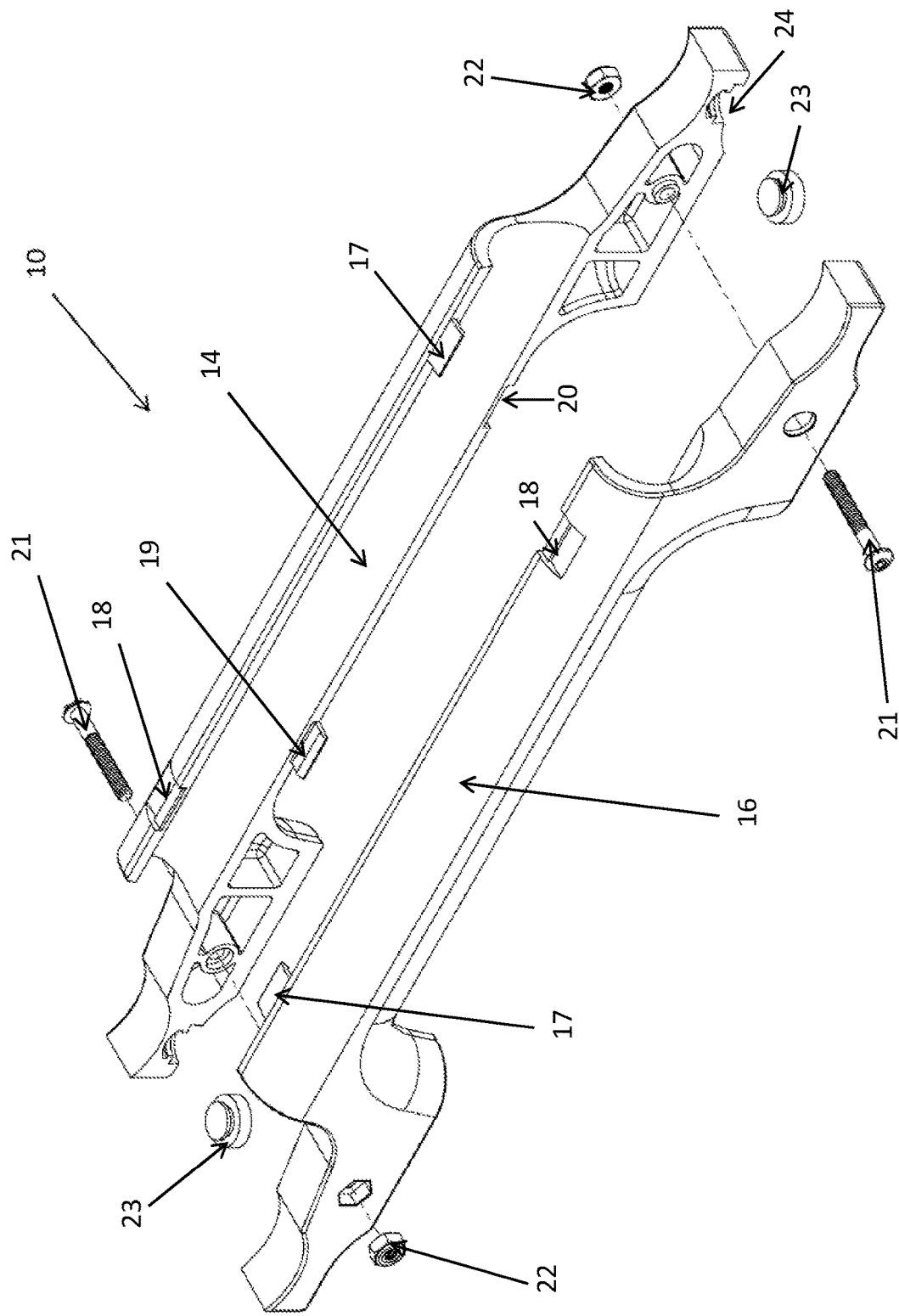
FIG. 2 is an exploded isometric view of the embodiment of FIG. 1.

Reference will now be made to FIGS. 1 and 2 which provide isometric views of an embodiment of the apparatus 10. The apparatus 10 comprises a generally cylindrical hollow body 11 and distal end portions 12a and 12b. The apparatus 10 shown in the drawings includes end portions 12a and 12b that are made of the same material as body 11. Apparatus 10 may be formed of a suitable material with sufficient stiffness, strength, and durability to accommodate the loads resulting from truss sections stacking, as described below. Examples of suitable materials for the apparatus 10 include wood, polyvinylchloride (PVC), polypropylene 20% talc, and high density polyethylene (HDPE). Preferably, the material is lightweight so as to minimize the weight added to the truss components that are being stored or transported. The inner dimensions of the hollow structure of body 11 are selected so that body 11 can accept a truss section cross member (cross bar) as described below.

As stated above, apparatus 10 has two ends 12a and 12b, which have first surfaces 13a,13b and second surfaces 15a,15b, respectively. For simplicity, reference hereafter will be made only to one such end 12b of the apparatus 10; however, a skilled person would understand that in the embodiment now described, both ends of apparatus 10 comprise the same, but mirrored, elements.

FIG. 2 illustrates an exploded isometric view of the embodiment shown in FIG. 1. In this embodiment, body 11 of apparatus 10 is comprised of a first shell portion 14 and a second shell portion 16. These two shell portions are able to connect to fit together to form a generally cylindrical hollow body 11 of apparatus 10. Further, portions 14, 16 are adapted such that body 11 is able to wrap around or envelop a cross bar of a truss section and therefore become affixed (or mounted) in place on the cross bar. As will be appreciated, when in place, the portions 14, 16 form a sleeve which fits over the cross member. The inner surfaces of both the first shell portion 14 and the second shell portion 16 are contoured so as to wrap around a cross bar so that when the apparatus 10 is thereby mounted on a truss section, the interaction of apparatus 10 with the truss section will restrict movement of the apparatus 10 relative to the truss section. The use of this sleeve structure permits the apparatus 10 to be a relatively low-profile device which conforms to the existing structure of the truss and is able to take advantage of the structural integrity of the truss cross member structure.

In the embodiment described, each of the first shell portion 14 and the second shell portion 16 comprise means which interoperate for securely attaching the two shell portions to each other. In this embodiment, the shell portions comprise a plurality of tabs 17 and 19 and a plurality of complementary recesses 20 and 18. The plurality of tabs are designed to fit within the complementary recesses 20 and 18 so that there is a tight fit between the first shell portion 14 and the second shell portion 16. In addition, the interconnecting shell portions 14, 16 of apparatus 10 may be designed to be attached together using fasteners, such as bolts 21 and nuts 22.

Figure 3:
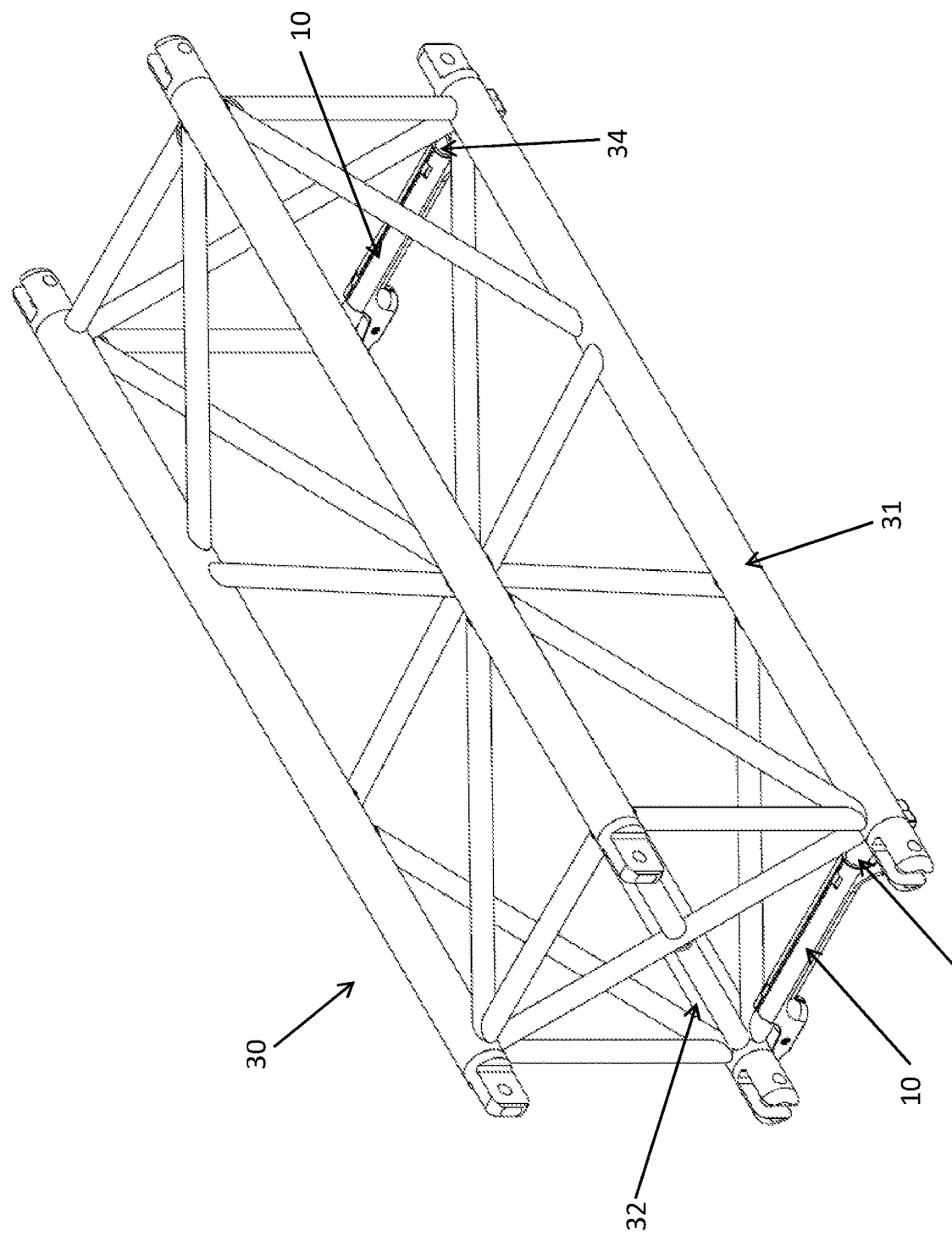
FIG. 3 is an isometric view of a pair of apparatuses of FIG. 1 attached to the lower cross members of a truss section.

Each of the distal ends 12a and 12b of the apparatus 10 includes surfaces configured to interface with members of truss sections, as described below and shown in the drawings. FIG. 3 shows the truss stacker adapter of apparatus 10 in place on and attached to a truss member (cross bar) 33. As will be apparent from FIG. 3, in this embodiment, the length of the sleeve of body 11 is somewhat less than the exposed length of cross member 33 such that apparatus 10 may be attached to truss section 30 by the sleeve of body 11 wrapping around or enveloping truss member 33 (as described above). As may be seen in FIGS. 1, 2 and 3, the distal end portions 12a and 12b of apparatus 10 include surfaces 13a and 13b which are configured to fit snugly against the longitudinal outer frame members of the truss section, as is shown in the example of FIG. 3 these are members 31, 32. The shape of the depressions of surfaces 13a and 13b and the shapes of the associated longitudinal members may be selected from different available options so long as they are configured such that they allow an appropriately close fit between the apparatus 10 and truss section 30 and that surfaces 13a, 13b are in load-bearing engagement with associated longitudinal members 31, 32, when truss section 30 is stacked, as described below. Such surfaces may also, due to their interaction with the truss section, maintain apparatus 10 in a relatively fixed position with respect to truss section 30.

Figure 6:
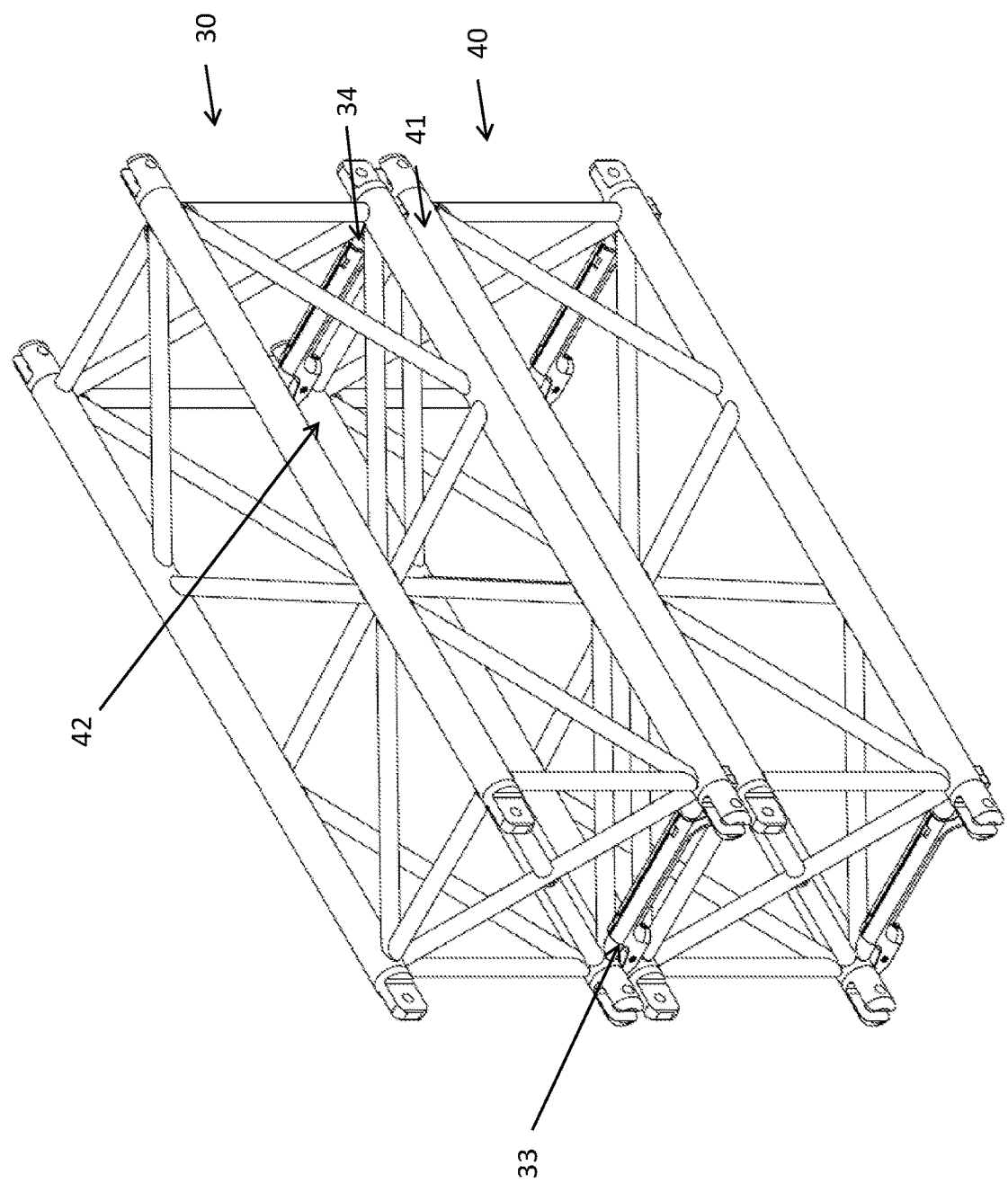
FIG. 6 is an isometric view of four of the apparatuses of FIG. 1 attached to a pair of truss sections.

Further, second surfaces 15a and 15b on end portions 12a and 12b, respectively, are each configured to form a depression or concave surface in the respective end portion. Each such concave surface is configured so that it corresponds to the curvature of the outside circumference of a longitudinal member of a second truss section (not shown in FIG. 3) that will stack with truss section 30. FIG. 6 shows truss section 40 which is an example such second truss section to be stacked with truss section 30.

In another embodiment, the distal ends of surfaces 15a and 15b may each end in a lip (not shown in the drawings). The arrangement of such a lip is designed so as to interact with a corresponding elongate member in a second truss section to provide further stability as between truss section 30 with apparatus 10 and such a second truss section when stacked together.

To increase the friction between the longitudinal members of the truss section and the depressions 15a or 15b, the surface of the depressions 15a and 15b may be provided with a friction surface. This may be achieved by, for example, applying a powder-coating to the surface to increase the coefficient of friction as between the surfaces 15a, 15b and the corresponding longitudinal member of the truss section (as, for example, 31 and 32 in FIG. 3). The surface of the depressions may alternatively be provided with a rough finish to seek to increase the coefficient of friction. In the embodiment of FIG. 2, apparatus 10 is provided with a pair of feet 23 located on the concave surfaces 15a, 15b. The feet may be made of any suitable material, such as rubbers or plastics, to provide for a higher friction interaction between apparatus 10 and longitudinal members in the truss section (31, 32 in FIG. 3, for example). The embodiment includes having each end of first shell portion 14 and second shell portion 16 being provided with respective recesses 24 for receiving the feet 23 in place and securing feet 23 when the two shell portions are attached together (in FIG. 2 only recesses 24 in one half of apparatus 10 are shown).

Increasing the friction of these portions of apparatus 10 is intended to reduce the risk of sliding of an longitudinal member while stacked on apparatus 10 and consequently the risk of a truss section sliding or shifting across the apparatus 10 (either laterally or along the axis of the longitudinal members of the truss section) and potentially slipping out from a stack.

Figure 5:
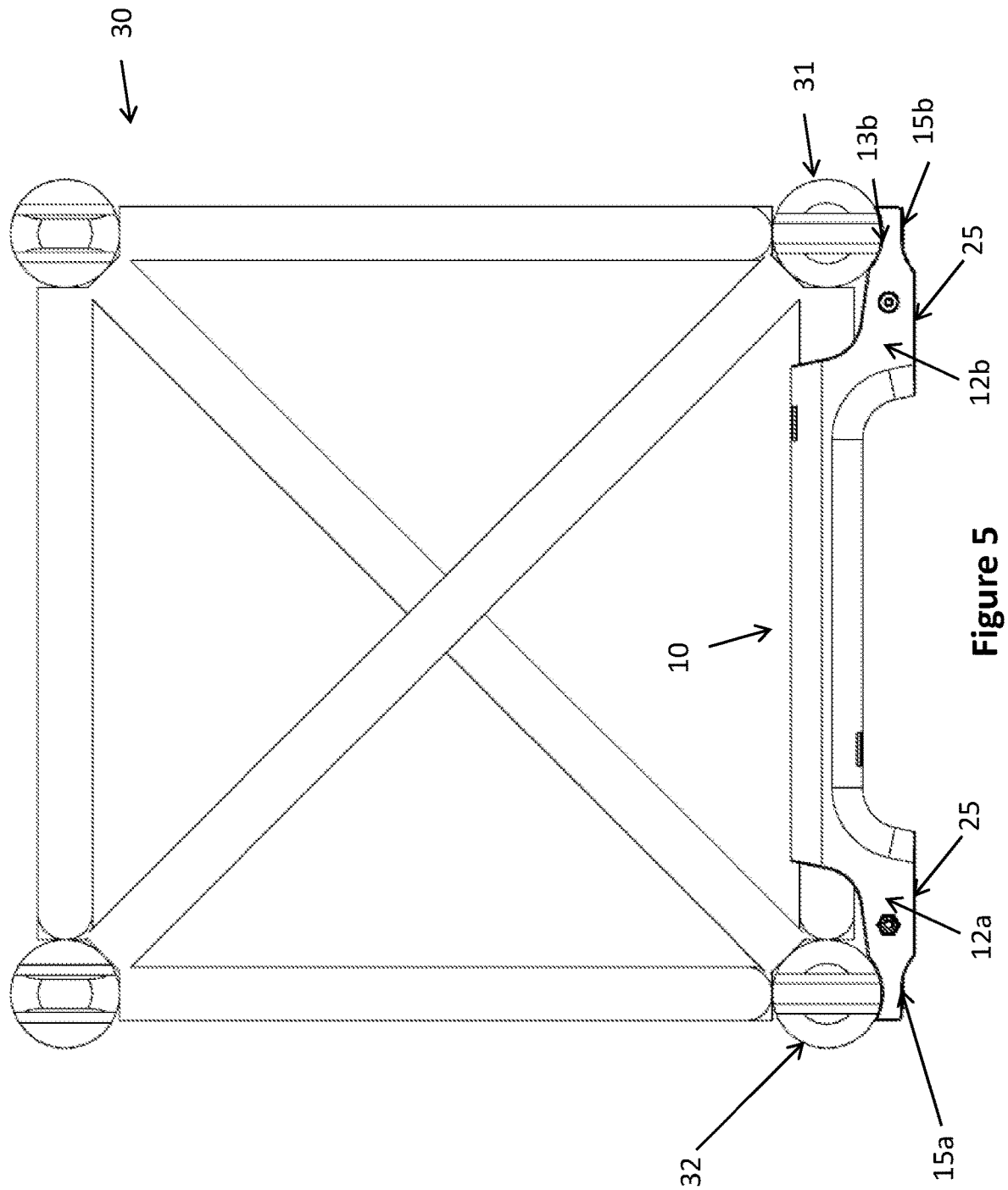
FIG. 5 is a front view of the assembly of FIG. 3.
Figure 7:
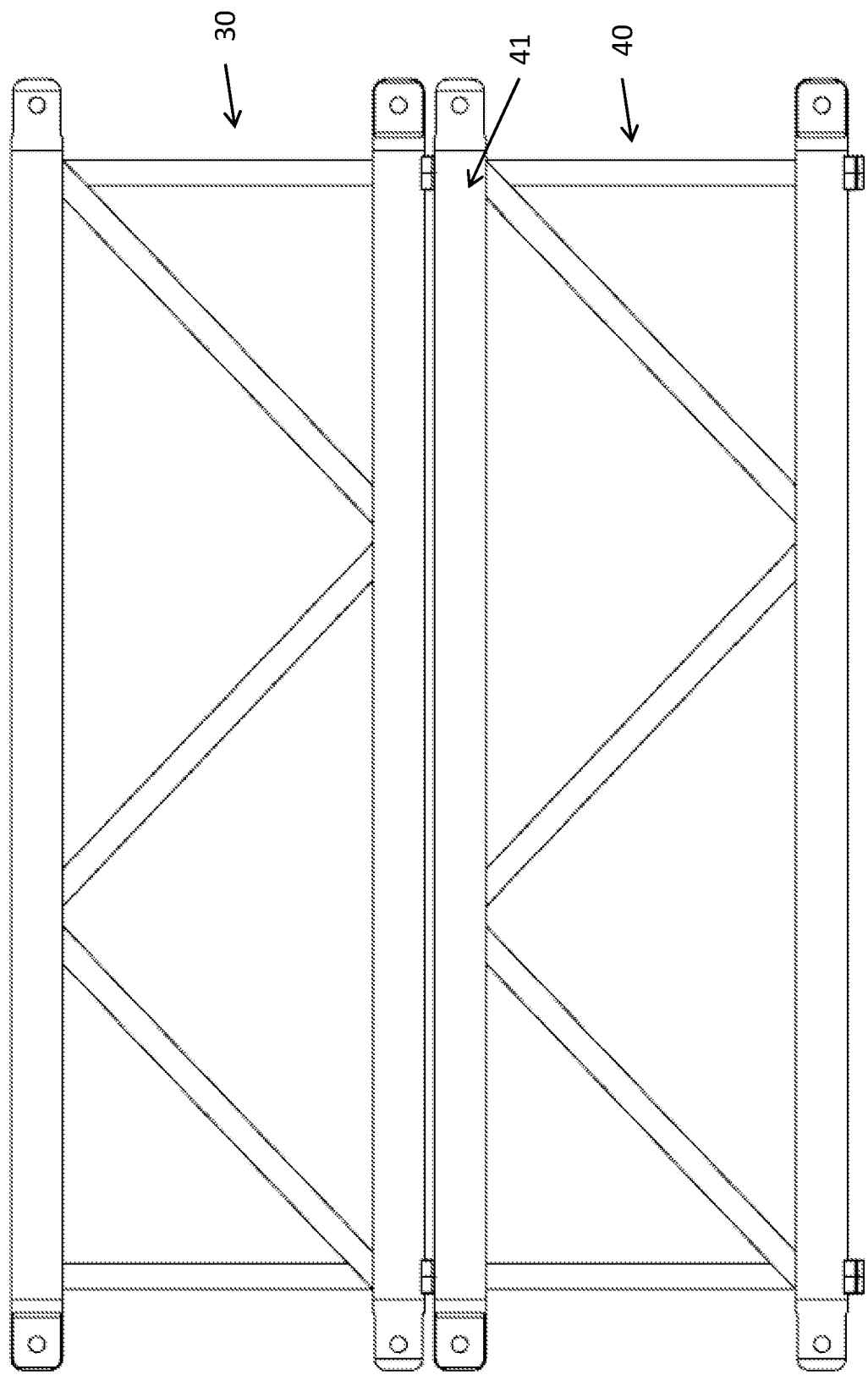
FIG. 7 is a side view of the assembly of FIG. 6.

FIG. 3 illustrates two examples of apparatus 10 as attached to cross members 33, 34 of truss section 30. In the orientation of truss section 30 shown in FIG. 3, the two examples of apparatus 10 are mounted or affixed to the lower portion of truss section 30. If truss section 30 is on the bottom of a set of stacked trusses, the two examples of apparatus 10 provide a stable base for resting the trusses on the ground, a floor, or on a dolly. This is done by providing each of apparatus 10 with a pair of flat surfaces 25 (see FIG. 1 and FIG. 5). Additionally, truss section 30 may be positioned on top of a second truss section such that the depressions 15a and 15b of the apparatus 10 rest on top of and in connection with the longitudinal members of the second truss section. FIGS. 6-8 illustrate how first truss section 30 is stacked on top of a second truss section 40 using apparatus 10 of the embodiment. As will be appreciated by those skilled in the art, when in use, the components mounted on a truss structure (lights, for example), are generally mounted on the longitudinal members of individual truss sections. When the apparatus 10 is attached to a truss section, the apparatus 10 (including end portions 12a, 12b) substantially aligns with the cross member to which it is attached (see, for example, FIGS. 6 and 7). Because the apparatus 10 is attached to and aligned with the cross member and due to its relatively low-profile design, it limits interference with components which may be mounted on longitudinal members of the truss section.

The description of the embodiment illustrated references a sleeve formed in body 11. The illustrated embodiment shows a two-part sleeve that, when mounted on a cross-member, envelopes the cross-member with a continuous inner surface of the body 11. It will be appreciated that other configurations of body 11 and fasteners 21, 22 may be employed to achieve the mounting function of the illustrated embodiment. For example, an appropriate surface with straps or fastening clips could mount body 11 to a cross member.

Figure 4:
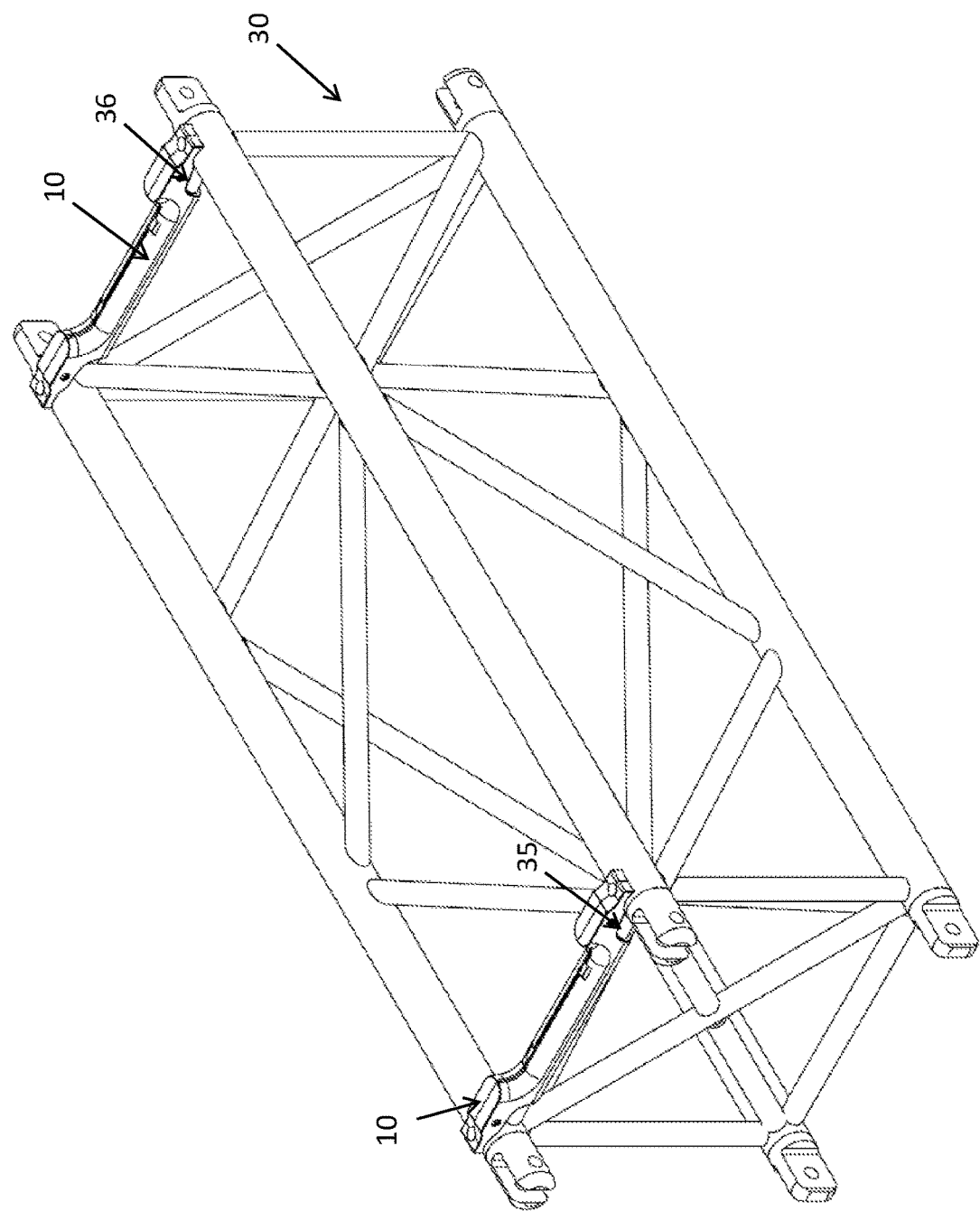
FIG. 4 is an isometric view of a pair of the apparatuses of FIG. 1 attached to the upper cross members of a truss section.

FIG. 4 illustrates an arrangement in which two examples of apparatus 10 are attached to cross members 35, 36 of truss section 30, respectively. In this orientation, the examples of apparatus 10 are attached so as to be on the upper portion of truss section 30. A second truss section may be positioned on top of the truss section 30 such that elongate members of the second truss section rest on top of depressions 15a and 15b, which are in this example, facing upwards from truss section 30. Accordingly, the apparatus 10 may be placed either on an upper portion of a truss section or a lower portion of a truss section. As will be apparent, it is preferred that each pair of stacked truss sections (one upper and one lower) will have a pair of the apparatus 10 devices installed such that there are in total four end portions which extend between the longitudinal members of the truss sections and which bear the load of the upper truss section on the lower.

Reference will now be made to FIGS. 6-8. As an example of how this embodiment may be used, prior to stacking truss sections (to store or transport truss sections), a worker takes a first apparatus 10 and mounts it to a cross member of a first truss section. In the embodiment described, for example, this is done by using the fasteners of tabs and recesses 17, 18 and 19, 20 as well as bolts 21 and nuts 22 to fasten a first shell portion 14 and second shell portion 16, onto a lower cross member 33 of the first truss section 30. The worker then takes a second apparatus 10 and mounts it to a second lower cross member 34 of truss section 30 in the same way. The two apparatuses 10 are preferably mounted on opposite distal ends of the truss section 30.

Once the apparatuses 10 are mounted to the truss section 30, it may be stacked on second truss section 40 such that depressions 15a and 15b of the end portions 12a, 12b rest on top of the elongate members 41 and 42, and position the first truss section 30 securely on top of the second truss section 40. This allows safer storage and transport of truss section stacks as it reduces the likelihood that one or more truss sections will shift or fall from a stack.

As can be seen in FIGS. 6-8, such an arrangement of apparatuses and truss sections allows the formation of a stack of truss sections. Ratchet straps (not shown) may be employed to further hold the stack of truss sections together.

When the truss sections are in use, apparatuses 10 need not be removed and stored away. The apparatuses can remain attached to members of truss sections, as they do not interfere with the operation of the truss sections. For example, it is intended that in normal use, truss sections may still be attached to other truss sections to form truss structures, and lighting or other equipment may still be mounted to the truss sections, even if apparatus 10 devices are mounted on truss sections. This is due to the low-profile design of the apparatus 10 which is substantially aligned with the cross member on which it is attached. This substantial alignment is such that the apparatus 10 does not interfere with the mounting of components onto the longitudinal members of the truss section. To the extent the apparatus 10 devices do otherwise interfere with the use of the truss sections when mounted, they may be removed from the truss section and stored separately for later use.

When a truss structure is disassembled after use, the truss sections with apparatuses 10 already mounted may be safely stacked on top of one another right away.

The apparatus is made of material of sufficient strength that, when mounted to longitudinal members of a truss section, the apparatus 10 may also form a footing for the truss section to sit atop, as described above. When used in this manner, the apparatus 10 can assist in absorbing the impact when a truss section impacts the ground or other hard surfaces and potentially reduce the damage to the truss section itself. Therefore, the apparatus 10 may be used as a replaceable component—replacing an apparatus 10 may be less costly than fixing or repairing truss sections that have been damaged. The sleeve-like structure of body 11 permits apparatus 10 to act as a relatively lightweight component of the truss section which adds to the structural integrity of the section and which does not interfere with the use of the truss. The thickness and strength of end portions 12a, 12b may be selected for the appropriate implementations of apparatus 10. However, it is possible to make apparatus 10 out of a single material that is appropriately strong and lightweight so as to bear the requisite loads while having a low-profile design that limits the impact of the apparatus on the use of the truss sections when mounted on a cross member.

In a further embodiment (not shown), as an alternative to a single device with two load-bearing end portions, a pair of independent components may be provided for attaching on opposite ends of a cross member or members. Each component comprises a sleeve portion which fits over and attaches to a cross member of a first truss section. Each component is provided with an end portion having a first surface and a second surface, the first surface being configured to fit snugly against the longitudinal outer frame members of the first truss section that it is attached to. The second surface is configured to correspond to the curvature or shape of a longitudinal member of a second truss section. In effect, the component will act as a single end portion and associated sleeve section of a body portion conforming to the description of the illustrated embodiment, above. A truss section may preferably be provided with two pairs of such components. One pair may be mounted on a cross member with each component being mounted at each distal end of a truss section. Alternatively, these components could be mounted on four different cross-members for an appropriate stacking truss arrangement. As will be apparent, the two pairs of components may be installed such that there are in total four end portions which extend between the longitudinal members of the truss sections and which bear the load of the upper truss section on the lower.

Although embodiments have been described above and are illustrated in the accompanying drawings in order to be more clearly understood, the above description is made by way of example and is not meant to limit the scope. It is contemplated that various modifications apparent to the person of skill in the art could be made without departing from the scope of the disclosure which is to be determined by the following claims.

The invention claimed is:

1. An apparatus for stacking a first truss section and a second truss section, the truss sections each comprising longitudinal members that are connected by cross members, the apparatus comprising:
   a first shell portion, comprising:
      a first end and a second end;
      a mounting portion intermediate the first and second ends for fixably mounting the apparatus to a cross member of a first truss section;
      wherein the first and second end each comprise a surface for receiving a pair of spaced apart longitudinal members of the second truss section; and
   a second shell portion adapted to mate with the first shell portion, the second shell portion comprising:
      a first end and a second end;
      a mounting portion intermediate the first and second ends for fixably mounting the apparatus to a cross member of a first truss section;
      wherein the first and second end each comprise a surface for receiving a pair of spaced apart longitudinal members of the second truss section; and
   wherein said first shell portion and second shell portion are mounted to the cross member by mating the mounting portion of the first shell portion and the mounting portion of the second shell portion around the cross member and fastening the two portions together;
   whereby when the longitudinal members of the second truss section are received by said surface of the first and second ends of said first and second shell portions, the first truss section and second truss section are restricted from movement relative to each other.

2. The apparatus of claim 1, wherein said surfaces for receiving the pair of spaced apart longitudinal members of the second truss section are friction surfaces.

3. The apparatus of claim 2, wherein said friction surfaces comprise feet.

4. The apparatus of claim 1, wherein said first and second ends further comprise a flat base portion adjacent said surface for receiving the longitudinal members, wherein said flat base portion is for resting the truss sections.

5. The apparatus of claim 1, wherein said first and second end further comprises an upturned lip for further restricting the relative movement between the first truss section and the second truss section.

6. The apparatus of claim 1, wherein said surface for receiving the pair of spaced apart longitudinal members of the second truss section are concave, wherein the curvature of said surface are dimensioned to closely fit around the longitudinal members of the second truss section.

7. The apparatus of claim 1, wherein the first and second shell portions are fastened together by at least one fastener.

* * * * *